Figure 1:
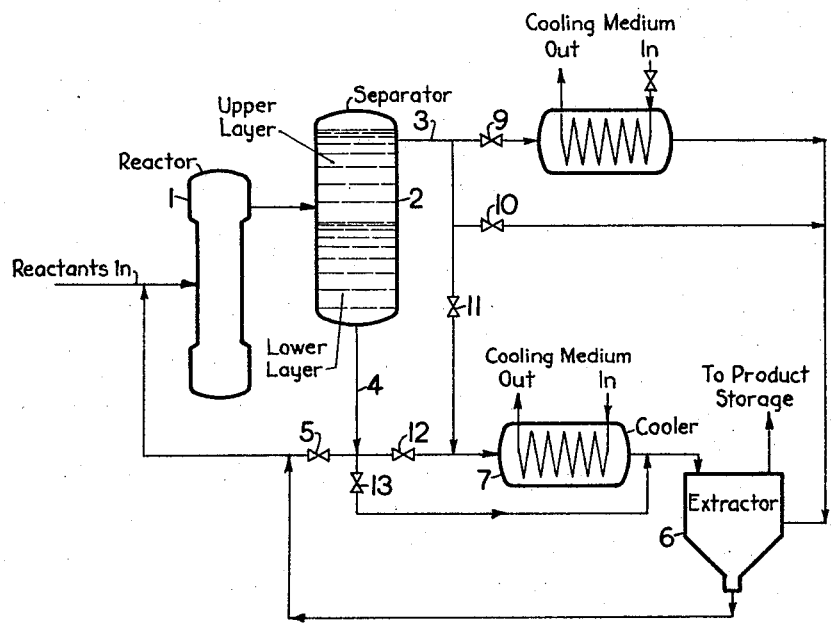

Oct. 3, 1939. T. EVANS 2,175,080

PROCESS FOR RECOVERY OF ORGANIC OXY-COMPOUNDS

Filed Aug. 10, 1937

Inventor: Theodore Evans
By his Attorney: Arthur B. Bakalar

Patented Oct. 3, 1939

2,175,080

UNITED STATES PATENT OFFICE

2,175,080

PROCESS FOR RECOVERY OF ORGANIC OXY-COMPOUNDS

Theodore Evans, Berkeley, Calif., assignor to Shell Development Company, San Francisco, Calif., a corporation of Delaware Application August 10, 1937, Serial No. 158,371

17 Claims. (Cl. 260—499)

This invention relates to the production of organic oxy-compounds such as alcohols, ethers, and the like and more particularly to the recovery of such products from mixtures comprising two liquid phases encountered in the course of manufacturing such oxy-compounds. It deals with a new and improved extraction process whereby the recovery of organic oxy-compounds may be materially simplified and improved and contamination of the product may be reduced.

I have discovered that the distributional equilibria of the different components of such mixtures vary with the temperature in different ways or at least in different degrees. Based upon this discovery I have developed a commercially available method whereby organic oxy-compounds may be selectively removed and recovered from that phase of the mixtures under discussion which is more pronouncedly hydrophobe in character.

The process of my invention essentially comprises extracting such hydrophobe-type phase with at least a part of the other phase present in the original mixture at a lower temperature than that prevailing during the initial separation of the phases. For the purpose of making my invention more clear it will be described with more particular reference to certain specific embodiments thereof as applied to the manufacture of esters, especially by esterification of olefines, as such processes represent a particularly important field of application of the principles of my invention. In order to show its wide applicability, illustrations will also be given of applications of my invention to the recovery of alcohols and ethers. It will be understood, however, that these illustrative examples are not intended to be exhaustive and are not to be considered as limitations on the invention as the same principles apply wherever an organic oxy-compound is to be recovered from a mixture comprising two liquid phases containing such compound.

In commercially feasible processes of catalytic esterification of olefines, such, for example, as that described in U. S. Patent 2,006,734, the reacted mixture is either initially, or after addition of suitable third agents or ester solvents, made up of two phases, namely a catalyst acid phase and an ester phase. The unreacted carboxylic acid present will be distributed in accordance with its partition coefficient between these two phases. Davis et al., in United States Patent 1,790,521, suggest several methods, such as neutralization, water washing and esterification with a more reactive alcohol, for removal of the acid from the ester. These procedures have the disadvantages of either converting the acid to an undesirable by-product or rendering it so dilute that expensive reconcentration is necessary before it may be effectively reused.

The distributional equilibria of carboxylic acids between the two phases present in reaction mixtures of the type under consideration varies with the temperature in such a manner that the acid content, both carboxylic and inorganic, of the ester phase is lowered by dropping the temperature, as is also the ester content although the latter figure is affected relatively slightly. By extracting the separated ester phase with at least a part of the catalyst phase at a relatively low temperature, the more desirable equilibrium of the lower temperature is established while cooling of large volumes of material is avoided with consequent saving in cooling requirements. As the physical equilibrium involving the distribution of the materials between the two phases is reached almost instantly with only relatively slight agitation of the phases, the process is very simple to operate and requires no elaborate apparatus. The carboxylic acid content of ester-containing mixtures may be thus substantially reduced and the cost of esterification acid thus materially decreased while purification of the ester is made cheaper.

Several different methods are available for carrying out the process of my invention as applied to the recovery of esters from olefine esterification mixtures the choice in any given case being conditioned primarily by the esterification procedure with which it is to be used. Figure 1 of the drawing is a flow diagram of one suitable method for carrying out the process of the invention. Thus, for example, where the esterification is carried out in a coil, or tower or other suitable reactor represented by 1 in Figure 1 of the drawing through which the phases are forced in turbulent flow or otherwise such that separation of phases is difficult in the reactor itself, it is advantageous to connect the reactor with an exterior separator such as a stratifier 2 from which the ester phase may be taken off as by valve controlled line 3 separately from the catalyst phase. The bulk of the latter may be directly recycled via lines 4 and 5 to the esterifier while at least a small part is sent to an extractor represented by 6 in Figure 1, preferably after suitable cooling in a cooler such as 7, where it is contacted with all the ester phase from the separator, which, preferably, is also precooled in a cooler such as 8. The extractor may be of any suitable type such as a tower or other device for promoting counter-current contact between immiscible liquids or a tank or other vessel in which the two liquids may be agitated, or the like. The extraction may be carried out continuously, batchwise or intermittently. Instead of cooling both phases either may be cooled alone by proper manipulation of valves 9, 10, 11, 12 and 13 to the extent necessary to give the desired low temperature after mixing or the mixture itself may be suitably cooled as by closing valves 9, 10 and 13, and opening valves 11 and 12.

Figure 2:
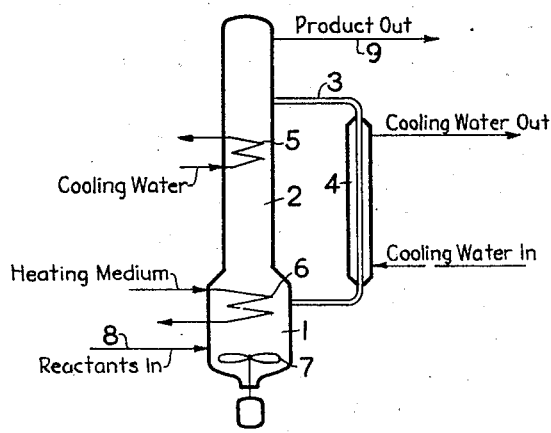

A simple type of apparatus which combines the reactor, separator and extractor in one unitary piece of equipment is shown in Figure 2 of the drawing comprises a paddle agitated mixing chamber 1 having a vertical pipe 2 attached thereto and a small diameter tube 3 connecting the side of the mixer with the vertical pipe at a point about two-thirds its height. The small tube is provided with a jacket 4 for circulation of cooling water which is also circulated through a coil 5 of copper tubing placed in about the middle of the vertical pipe. To make clear the operation of this device, its use in the production of secondary amyl acetate from a pentane-amylene fraction containing 1.5% tertiary amylene, 26.3% secondary amylenes and 72.2% pentane will be described by way of example. Where a mixing chamber 1 of about one liter capacity was used with a vertical pipe 2 about 95 cm. long having a volume of about 1.5 liters, 1800 cc. of catalytic lower layer was introduced as initial charge. This was made up by mixing equal volumes of glacial acetic acid, 80% sulfuric acid and amyl acetate. After charging the reactor was heated by heating means 6 to 60° C. and the charge was found to fill the mixing chamber and the lower half of the vertical pipe. The paddle 7 was then set in motion. Its rotation in a horizontal plane created sufficient centrifugal force to circulate some of the charge through the small tube 3 into the vertical pipe 2 through which it returned to the mixing chamber 1. Feed stock made up of the pentane-amylene fraction and glacial acetic acid in the proportion of 6.25 to 1 by volume was then run into the mixer under about 80 lbs. pressure per sq. in. via feed line 8. The temperature of the mixing chamber was maintained at 80° C. while the portion of the lower layer which circulated through the small tube was cooled to approximately 20° C. before it entered the vertical pipe. The upper portion of the vertical pipe was kept at about the same temperature by the cooling water circulating in the coil 5 inside the pipe. Due to the presence of a large amount of lower layer at 80° C. the reaction between the acetic acid and amylene proceeded rapidly in the mixing chamber. Due to its low density the hydrocarbon phase containing the amyl acetate produced rose thru the vertical pipe 2 where it came into contact with the cooled lower layer entering from the small tube 3. This contacting of the product layer with lower layer extracted unreacted acetic acid from the former. The cooled, extracted upper layer was then drawn off at the top of the vertical pipe via line 9 and treated by the process of United States Patent 2,042,218 for removal of sulfuric acid, before final recovery and purification of the amyl acetate by distillation using the azeotropic distillation method therein described in a continuous manner.

The application of the process of my invention resulted in a material reduction in the amount of acetic acid which had to be distilled from the product compared with prior procedures, as shown by the following analyses of typical ester layers obtained by otherwise identical methods.

|  | Old method | New method | |
| --- | --- | --- | --- |
|  | Esterification at 80° C. and phase separation at the same temperature without extraction | Esterification at 80° C. and phase separation at the same temp. followed by extraction of the ester phase with one-seventh its volume of lower phase at 20° C. | Same except extraction of the ester phase with one-fifth its volume of lower phase at 20° C. |
| Free acidity of recovered ester phase | 1.19N | 1.03N | 1.01N |
| Amyl acetate content | 187 grams/l. | 182 grams/l. | 180 grams/l. |

In another similar case extracting four volumes of upper layer with one volume of lower layer at 20° C. reduced the free acidity from 1.07N to 0.85N while the amyl acetate content was only reduced from 186 grams per liter to 181 grams per liter. In these determinations of acidity some small amount of sulfuric acid is probably included but since its removal is just as desirable as the removal of acetic acid no effort was made to distinguish between the two acids.

The temperature at which the extraction may be carried out, as well as the ratio of extractant to ester phase used may be varied widely. The lower temperature limit is the freezing point of the higher freezing phase but I find it unnecessary to operate at such extremely low temperatures and prefer to carry out the extraction within the range of about 5° to about 30° C. The higher the ratio of extractant to ester phase used, the more cooling water required, so I prefer to employ the more economical ratios of about $\frac{1}{10}$ to about $\frac{1}{3}$ volumes of extractant per volume of ester phase.

Among other typical examples of esters which may be purified of the corresponding free carboxylic acid by the process of my invention are, for example, the ethyl, propyl, isopropyl, normal butyl, isobutyl, secondary butyl, tertiary butyl, amyl, allyl and like esters of acids such as formic, propionic, butyric, isobutyric, crotonic, benzoic, succinic, methacrylic and the like and their homologues and analogues. The carboxylic acid and/or ester present in the mixture may be saturated or unsaturated and may contain substituents as halogen, hydroxy groups, and the like.

As esterification agents which may be components of the extractant used in the process of my invention are included any esterification catalyst which forms a two phase system with the ester to be treated and which is a solvent for the carboxylic acid to be removed, such as, for example, sulfuric, hydrochloric, phosphoric, chloracetic, benzene sulfonic, and like acids and aqueous solutions or suspensions of acid salts such as sodium bisulfate and the like. The extractants used in accordance with my invention will be mixtures made up preponderantly of the same components as the ester phase, usually in the proportions corresponding to the distributional equilibria of such components at the temperature at which the ester phase is withdrawn, preferably approximately the esterification temperature. But other compositions and proportions of components may also be used, as where, for example, make up catalyst is added to the ester, or where water or some other undesirable component which is accumulating in the catalyst phase is removed prior to the use of such phase as extractant. The term "esterification catalyst phase" as used in the appended claims is intended to cover these and similar variations in the extractant.

It will be apparent that the process of my invention offers many advantages, particularly in economy of operation and savings in acid cost and distillation expenses, over prior methods of purifying esters. It is not only capable of wide variation with respect to the type of esterification reaction with which it may be used but also the operating arrangements may be greatly modified. Thus it may be used, for example, in connection with esterification procedures such as that described in United States Patent 1,877,291, where unreacted carboxylic acid normally lost in the aqueous phase of the condensate obtained on distillation of the ester-containing hydrocarbon may be recovered by extraction of that hydrocarbon with a part of the extracted acid phase before carrying out such distillation. Where alcohols are being esterified under such conditions that the product is in the liquid phase, e. g., where the esters cannot be distilled off under practical conditions without decomposition as in the case of esters of higher fatty acids and the like and removal of water from the catalyst phase is necessary, such removal may conveniently be made from that portion of the catalyst phase withdrawn for use as extractant in accordance with my invention and the removal of water may be effected either before or after the extraction operation. In such cases, furthermore, my extraction procedure may be used to recover unreacted alcohol from the ester phase instead of carboxylic acid or in addition thereto.

As applied to the recovery of ethers produced by reacting an olefine with an alcohol, suitable methods for which are described in U. S. Patents 1,968,601, 2,042,219 and 2,067,385, for example, the process of my invention may be carried out in a manner similar to that hereinbefore described the essential difference being only that unreacted alcohol together possibly with small amounts of catalyst acid where such is also present, is extracted from the ether phase by contacting it with a part of the catalyst phase at a temperature below that used for separation of these phases in the etherification process. The same type of combined reactor, separator and extractor described in the specific example on the esterification of secondary amylenes, may, for example, be advantageously used. Alternatively, the different operations may be carried out in separate pieces of apparatus. Thus, for example, methyl-tertiary amyl ether was produced by reacting a tertiary amylene containing pentane-amylene fraction with methyl alcohol in the presence of sulfuric acid in a bronze mixer of 900 cc. capacity connected with a copper separator which was piped to a water-cooled extractor. When the reaction was carried out at 50° C. using a volume ratio of lower layer (methyl alcohol-sulfuric acid mixture containing about 56% alcohol by weight) to upper layer of 6 to 8:1, a take-off rate of 2.1 liters per hour was possible without reducing the ether content of the upper phase below the equilibrium value of 115 to 120 grams per liter. Dropping the reaction temperature to 40° C. reduces the yield by over 15%. Increasing the temperature to 60° C. raises the pentane-amylene thruput rate from 2.1 to 4.6 liters per hour and more than doubles the yield. The loss of methyl alcohol in the upper layer is quite material at any of these operating temperatures, however, being 5.6 grams per liter at 40°, and 6.2 at 50° and 6.3 at 60° C. By washing the upper layer from the separator with a small amount of lower layer after cooling to bring the temperature of the mixture to 20° C., the alcohol loss was reduced to 3.5 grams per liter of extracted upper layer. Still other applications of my process to the etherification of olefines will be obvious to those skilled in the art. It will be clear, for example, that where ethers are produced from olefines alone, the process is equally useful for the separation of alcohol, simultaneously formed, from the product so that it may be returned to the reactor for conversion to ether.

The foregoing examples will also make clear the applicability of similar procedures for the recovery of alcohol from the hydrocarbon phases obtained in the hydration of olefines, for example, by the methods described in United States Patents 2,010,686, 2,012,787, 2,060,143 and 2,067,616. It may be used in connection with still other olefine reaction methods being applicable, for example, where cyclic olefines such as cyclopentene and the like are used instead of open chain olefines and where suitable substitution products such as halogenated olefines and the like are employed as starting material. It is further applicable where alkyl acid sulfates or the like are used as starting materials or are formed as intermediates in the process of producing organic oxy-compounds. Thus the process of my invention may thus be used to recover an alcohol or a mixture of alcohols from hydrocarbon or neutral alkyl sulfate phases or the like such as occur as upper layers during the hydrolysis of alkyl acid sulfate containing olefine absorption products or the like, as well as to recover such alcohol or alcohols from phases predominantly composed of unreacted hydrocarbons encountered in olefine absorption operations. Another type of alcohol-containing hydrocarbon phase which may be advantageously treated for recovery of alcohol by the process of my invention, is for example, the hydrocarbon fraction or polymer cut or the like recovered during distillation of the alcohol produced. By extracting any or all such mixtures with the acid used for olefine absorption and carrying out the extraction at a low temperature material amounts of alcohol may be recovered without resort to expensive distillation. Thus, for example, in the absorption of isobutylene in aqueous sulfuric acid two phases are usually obtained on stratification of the reaction mixture.

The upper layer will usually be predominantly unreacted hydrocarbons, although some polymer may also be present but from about 2% to about 6% tertiary butyl alcohol may be present depending on the strength of sulfuric acid used and the reaction conditions employed. The lower layer will then contain sulfuric acid, tertiary butyl alcohol and water. By separating the layers and extracting the upper layer with a part of the lower layer at a temperature below that used in the phase separation, 50% or more of the tertiary butyl alcohol normally lost in the exciting hydrocarbons may be recovered with little, if any, additional expense. The extract may then be added to the normal absorption product for recovery of the alcohol in the usual way.

The foregoing illustrative examples will make it clear that the process of my invention is broadly applicable to the recovery of a wide variety of organic oxy-compounds from two phase mixtures encountered in the process of manufacturing such compounds, whether the oxy-compound to be recovered is the reaction product itself or an unreacted component of the reaction mixture. It will therefore be appreciated that still other applications and modifications of the process of my invention may be made without departing from the spirit thereof and that it is not to be regarded as limited to the details of operation disclosed nor by the soundness of the theory advanced in explanation of the improved results attained, but only by the terms of the accompanying claims, in which it is my intention to claim all novelty inherent therein as broadly as is possible in view of the prior art.

I claim as my invention:

1. In a process for the production of an organic oxy-compound wherein the stratified reaction mixture contains a water-soluble organic oxy-compound distributed between a predominantly hydrocarbon phase and an aqueous acid phase, the method of removing the water-soluble organic oxy-compound from the hydrocarbon phase which comprises, separating said hydrocarbon phase from the aqueous acid phase and extracting at least a part of the water-soluble organic oxy-compound contained in the separated hydrocarbon phase by intimately contacting it with about one-tenth to about one-third of its volume of the separated other phase at a temperature substantially below that prevailing during the said phase separation.

2. In a process for the production of an olefine hydration product wherein the stratified reaction mixture contains an alcohol distributed between a substantially water-immiscible phase and an aqueous olefine hydration catalyst phase, the method of removing the alcohol from the water-immiscible phase which comprises separating said phases and extracting at least a part of the alcohol content of the hydrocarbon phase by intimately contacting said phase with about one-tenth to about one-third of its volume of the separated catalyst acid phase at a temperature substantially below that prevailing during the said phase separation.

3. In a process for the production of an alcohol wherein the stratified reacted mixture contains the alcohol distributed between a hydrocarbon phase and an inorganic polybasic acid phase, the method of removing the alcohol from the hydrocarbon phase which comprises separating the hydrocarbon phase containing said alcohol from the inorganic polybasic acid phase and extracting alcohol from the former by intimately contacting it with a part of the separated acid phase at a temperature substantially below that at which the said phase separation was carried out.

4. In a process for the production of an ether wherein the stratified reacted mixture contains an alcohol distributed between the ether phase and an etherification catalyst phase, the method of removing the alcohol from the ether phase which comprises separating said phases, extracting at least a part of the alcohol content of the ether phase by intimately contacting the ether phase with a minor part of the separated catalyst phase at a temperature substantially below that at which the said phase separation was carried out and using the extract for further etherification.

5. In a process for the production of an organic carboxylic acid ester wherein the stratified reacted mixture contains a free carboxylic acid distributed between a carboxylic acid ester phase and an esterification catalyst phase, the method of removing the carboxylic acid from the carboxylic acid ester phase which comprises separating the esterification catalyst phase from the ester phase and extracting free acid from the latter by intimately contacting it with a minor part of the separated esterification catalyst phase at a substantially lower temperature.

6. In a process for the production of an organic carboxylic acid ester wherein the stratified reacted mixture contains an unreacted carboxylic acid distributed between a carboxylic acid ester phase and an esterification catalyst phase, the method of removing the carboxylic acid from the carboxylic acid ester phase which comprises extracting unreacted carboxylic acid from the ester phase by intimately contacting the ester phase with about $\frac{1}{10}$ to about $\frac{1}{3}$ of its volume of an esterification catalyst phase at a temperature at least 20° C. below that at which the ester phase was separated from the catalyst phase and using the extract for further esterification.

7. In a process for the production of an organic carboxylic acid ester wherein the stratified reacted mixture contains an unreacted carboxylic acid distributed between a carboxylic acid ester phase and an esterification catalyst phase, the method of removing the carboxylic acid from the carboxylic acid ester phase which comprises separately withdrawing from said mixture ester phase and a part of the esterification catalyst phase, substantially lowering the temperature of the latter and intimately contacting it with the withdrawn ester phase to extract unreacted carboxylic acid therefrom.

8. In a process for the production of an organic carboxylic acid ester by reacting an olefine with a carboxylic acid wherein the stratified reacted mixture contains an unreacted carboxylic acid distributed between carboxylic acid ester phase and an esterification catalyst phase, the method of removing the carboxylic acid from the carboxylic acid ester phase which comprises separating ester phase from the catalyst phase and extracting free carboxylic acid from the separated ester phase by intimately contacting it with a part of said catalyst phase at a temperature substantially below that at which said phase separation is effected.

9. In a process for the production of an alkyl ester of an aliphatic carboxylic acid by reacting an olefine with an aliphatic carboxylic acid in the presence of a catalyst acid wherein the reacted mixture contains an unreacted carboxylic acid distributed between a water-immiscible ester and hydrocarbon-containing phase and the catalyst acid phase, the method of removing the unreacted carboxylic acid from the water-immiscible phase which comprises removing the bulk of said catalyst acid from the reaction mixture, and extracting unreacted carboxylic acid from the remainder by intimately contacting it with a minor part of the separated catalyst acid phase at a temperature at least 20° C. below that at which said catalyst acid removal is effected.

10. In a process for the production of an alkyl ester by reacting a mono-olefine with a mono-basic aliphatic carboxylic acid in the presence of sulfuric acid wherein the stratified reaction mixture contains unreacted carboxylic acid distributed between the carboxylic acid ester phase and the sulfuric acid phase, the method of removing the carboxylic acid from the ester phase which comprises mechanically separating the bulk of the sulfuric acid from the reaction mixture and then extracting unreacted carboxylic acid from the remaining ester by intimately contacting the latter with a minor part of the separated sulfuric acid phase at a temperature at least 20° C. below that at which said acid separation is effected.

11. In a process for the production of an alkyl acetate by reacting an olefine with acetic acid in the presence of sulfuric acid, the method of removing unreacted acetic acid from the alkyl acetate phase which comprises separating the sulfuric acid phase from the reaction mixture, and extracting the remainder of the mixture by intimately contacting it with about one-tenth to about one-third of its volume of the separated sulfuric acid phase at a temperature at least 20° C. below that at which said phase separation was effected.

12. In a process for the production of an amyl acetate by reacting an amylene-containing hydrocarbon with acetic acid in the presence of a sulfuric acid catalyst, the method of removing unreacted acetic acid from the amyl acetate produced which comprises separating the sulfuric acid catalyst phase from the mixture and extracting unreacted acetic acid from the amyl acetate produced by intimately contacting it with a minor part of the separated catalyst phase at a temperature at least 20° C. below that at which said acid separation is effected.

13. In a continuous process of esterifying an olefine in the presence of sulfuric acid, the steps of continuously feeding hydrocarbon containing said olefine and a carboxylic acid reactive therewith into contact with a sulfuric acid containing phase under esterifying conditions, continuously withdrawing hydrocarbon containing ester produced and unreacted carboxylic acid, separately withdrawing a part of the sulfuric acid containing phase, cooling at least one of the withdrawn phases intimately, re-contacting the withdrawn phases after said cooling at a temperature at least 20° C. below that at which said hydrocarbon withdrawal was effected, and continuously returning the sulfuric acid containing phase to the esterifier after said contact.

14. In a process of recovering an organic hydroxy-compound from a mixture of said hydroxy-compound and hydrocarbon obtained in the manufacture of an olefine derivative by reaction of olefine containing hydrocarbon with a catalyst acid phase, the step of extracting at least a part of said organic hydroxy-compound from said mixture by intimately contacting the latter with a part of the catalyst acid phase from said reaction at a temperature substantially below that at which the catalyst acid phase used is separated from the reaction mixture.

15. In a process of recovering an alcohol from a mixture of alcohol and hydrocarbon obtained in the manufacture of said alcohol by reaction of the corresponding olefine with a strong polybasic inorganic acid, the step of extracting a minor part of the alcohol content of said hydrocarbon containing mixture by intimately contacting the mixture with a phase containing said inorganic acid separated from said reaction, said contacting being carried out at a temperature at least 20° C. lower than that at which the polybasic inorganic acid containing phase is separated from the reaction mixture.

16. In a process of recovering an alcohol from a polyphase hydrolysis product of an alkyl sulfate comprising a hydrocarbon phase and an aqueous sulfuric acid phase both of which phases contain said alcohol, the steps of separating said phases and extracting the separated hydrocarbon phase by intimately contacting it with a minor part of the separated sulfuric acid phase at a temperature at least 20° C. below that prevailing during said phase separation.

17. In a process for the production of an organic oxy-compound wherein the reacted mixture comprises a substantially water-immiscible phase and an aqueous inorganic acid phase with a water-soluble organic oxy-compound distributed between the two phases, the method of removing the water-soluble organic oxy-compound from the water-immiscible phase which comprises separating the two phases and extracting the water-soluble organic oxy-compound from the water-immiscible phase by intimately contacting said phase with a minor part of the separated aqueous catalyst phase at a temperature substantially below that at which the initial phase separation was effected.

THEODORE EVANS.